(12) United States Patent
McDonald

(10) Patent No.: US 9,212,304 B2
(45) Date of Patent: Dec. 15, 2015

(54) USE OF HIGH RATIO AQUEOUS ALKALI SILICATES IN DRILLING FLUIDS

(75) Inventor: Michael J. McDonald, Toronto (CA)

(73) Assignee: PQ CORPORATION, Malvern, PA (US)

( * ) Notice: Subject to any disclaimer, the term of this patent is extended or adjusted under 35 U.S.C. 154(b) by 569 days.

(21) Appl. No.: 13/424,547

(22) Filed: Mar. 20, 2012

(65) Prior Publication Data

US 2012/0245059 A1   Sep. 27, 2012

Related U.S. Application Data

(60) Provisional application No. 61/454,675, filed on Mar. 21, 2011.

(51) Int. Cl.
*C09K 8/05* (2006.01)
*C09K 8/14* (2006.01)

(52) U.S. Cl.
CPC . *C09K 8/145* (2013.01); *C09K 8/05* (2013.01); *C09K 2208/12* (2013.01)

(58) Field of Classification Search
CPC .......................................................... C09K 8/05
See application file for complete search history.

(56) References Cited

U.S. PATENT DOCUMENTS

| | | | |
|---|---|---|---|
| 2,133,759 A | 10/1938 | Vail et al. | |
| 2,146,693 A | 2/1939 | Vietti et al. | |
| 3,492,137 A * | 1/1970 | Iler | 106/636 |
| 3,625,722 A | 12/1971 | Freyhold et al. | |
| 4,988,450 A | 1/1991 | Wingrave et al. | |
| 5,624,651 A | 4/1997 | Bass | |
| 7,137,459 B1 * | 11/2006 | Dearing, Jr. | 175/40 |
| 7,441,609 B2 | 10/2008 | Dearing, Jr. | |
| 2009/0314549 A1 | 12/2009 | Chenevert et al. | |

OTHER PUBLICATIONS

Kirk-Othmer, "Silica", Encyclopedia of Chemical Technology, 1997, Fourth Edition, vol. 21, John Wiley & Sons.
Van Oort et al., "Silicate-Based Drilling Fluids: Competent, Cost-effective and Benign Solutions to Wellbore Stability Problems", IADC/SPE 35059 Paper presented at 1996 IADC/SPE Drilling Conference, Mar. 12-16, 1996, pp. 189-204.
Duncan, et al., "Exceeding Drilling Performance and Environmental Requirements with Potassium Silicate Based Drilling Fluid", Society of Petroleum Engineers, Inc., Seventh SPE International Conference on Health, Safety, and Environment in Oil and Gas Exploration and Production held in Calgary, Alberta, Canada, Mar. 29-31, 2004.

\* cited by examiner

*Primary Examiner* — Randy Gulakowski
*Assistant Examiner* — Jeffrey Washville
(74) *Attorney, Agent, or Firm* — Buchanan Ingersoll & Rooney PC

(57) ABSTRACT

An improved drilling and completion fluid can be used in subterranean drilling for oil and gas. Sodium silicate and potassium silicate-based drilling fluids are commonly used drilling fluids with the notable attributes of exceptional shale stabilization characteristics coupled with exceptional environmental performance Environmental and wellbore stabilization characteristics are improved by using high ratio aqueous silicates wherein ratio is defined as the molar ratio of $SiO_2:Me_2O$, where Me is an alkali and is most commonly sodium or potassium (i.e. $Na_2O$ and $K_2O$). For high ratio aqueous alkali silicates, the molar ratio of $SiO_2:Me_2O$ can range from just over 4.0 to about 12.0.

17 Claims, 1 Drawing Sheet

USE OF HIGH RATIO AQUEOUS ALKALI SILICATES IN DRILLING FLUIDS

CROSS-REFERENCE TO RELATED APPLICATIONS

This application claims priority to U.S. Provisional Patent Application No. 61/454,675, filed on Mar. 21, 2011. That application is incorporated by reference herein.

FIELD OF THE INVENTION

This invention relates to drilling fluids and more particularly to the use of high ratio alkali silicates in drilling fluids.

BACKGROUND OF THE INVENTION

During the drilling of an oil and gas well, a specialized fluid referred to as a drilling fluid or alternatively a "mud" is circulated through the drill pipe and bit. The principal functions of a drilling fluid include: stabilizing geological formations, providing hydrostatic pressure, cooling the drill bit, and carrying drill cuttings beneath the bit to transport them up to the surface for separation. The other key function of a drilling fluid is to act a lubricant between the drill pipe and the borehole and/or metal casing. The drilling fluid also acts as a lubricant for the drill bit.

Drilling fluids can be categorized as being either water-based or oil-based. In general, water-based drilling fluids are lower cost and have much better health, safety and environmental performance than oil-based drilling fluids. However, oil-based fluids offer certain performance advantages such as excellent shale stabilization. Sodium & potassium silicate based drilling fluids are one of the few water-based drilling fluids that can match the shale inhibition properties of oil based drilling fluids. The efficacy of silicate-based systems for shale inhibition has been known since the 1930's. The shale inhibition properties of silicate-based drilling fluids have been well documented in numerous scientific documents such as, for example, E. van Oort, Shell Research Rijswijk; D. Ripley, I. Ward, J. W. Chapman, BW Mud Aberdeen, R. Williamson Mobil, M. Aston, BP Exploration: Silicate-Based Drilling Fluids: Competent, Cost-effective and Benign Solutions to Wellbore Stability Problems", SPE paper 35059 presented at SPE/IADC Drilling Conference, New Orleans, La., March 1996.

Silicate-based drilling fluids began to make a commercial comeback in the 1990's beginning in the North Sea. The resurgence of silicate-based drilling fluids was driven by a combination of favorable economics, demand for products with better environmental performance and advancements in drilling fluid formulation technology (e.g. synthetic polymers for rheology control). Silicate-based drilling fluids have continued to gain in commercial acceptance and are used around the globe for offshore and on-land drilling operations. It is anticipated that this trend will continue as Regulatory Bodies as well as the public place greater scrutiny on the drilling and completion of wells. The environmental performance of silicate-based fluids is also well documented, such as in Duncan, Petro Canada, M. McDonald, National Silicates: "Exceeding Drilling Performance and Environmental Requirements with Potassium Silicate Based Drilling Fluid", SPE 86700, International Conference on HS&E, Calgary, Alberta, March 2004.

Over the decades, the vast majority of drilling fluids have been formulated with either sodium silicate or potassium silicate using standard, commercially available ratio products. However, such drilling fluids have not used high ratio aqueous alkali silicates. Other forms of alkali silicate do exist and it is anticipated that those forms of alkali silicate would also show similar benefits with higher ratio as presented below with respect to sodium silicate and potassium silicate.

In the silicate industry, the term ratio typically refers to the weight ratio of $SiO_2$ to $Me_2O$ (where Me is the alkali and is most commonly sodium or potassium). Among scientists, it is more common to refer to ratio as the molar ratio of $SiO_2$ to $Me_2O$. Coincidentally, the molecular weight of $Na_2O$ (62) and $SiO_2$ (60) are close enough that the molar ratio and weight ratio can be used interchangeably for sodium silicate. For other sources of alkali silicate, the weight ratio does not match the molar ratio. Reference will be made herein to specify whether the ratio refers to weight or molar ratio.

Table I below, which is derived from U.S. Pat. No. 5,624,651 to Bass, presents the composition and typical properties of commercial grades of liquid sodium silicate and potassium silicate.

TABLE I

| Alkali Metal | Wt. Ratio $SiO_2:M_2O$ | Molar Ratio $SiO_2:M_2O$ | $SiO_2$ (%) | $Na_2O$ (%) | Density (lb/gal) | Viscosity (centipoise) |
|---|---|---|---|---|---|---|
| Sodium | 3.75 | 3.87 | 25.3 | 6.75 | 11.0 | 220 |
|  | 3.25 | 3.36 | 29.9 | 9.22 | 11.8 | 830 |
|  | 3.25 | 3.36 | 28.4 | 8.7 | 11.6 | 160 |
|  | 3.22 | 3.33 | 27.7 | 8.6 | 11.5 | 100 |
|  | 2.87 | 2.97 | 32.0 | 11.1 | 12.4 | 1,250 |
|  | 2.58 | 2.67 | 32.1 | 12.5 | 12.6 | 780 |
|  | 2.50 | 2.58 | 26.5 | 10.6 | 11.7 | 60 |
|  | 2.40 | 2.48 | 33.2 | 13.85 | 13.0 | 2,100 |
|  | 2.20 | 2.27 | 29.2 | 13.3 | 12.5 | — |
|  | 2.00 | 2.07 | 29.4 | 14.7 | 12.8 | 400 |
|  | 2.00 | 2.07 | 36.0 | 18.0 | 14.1 | 70,000 |
|  | 1.90 | 1.96 | 28.5 | 15.0 | 12.7 | — |
|  | 1.80 | 1.86 | 24.1 | 13.4 | 12.0 | 60 |
|  | 1.60 | 1.65 | 31.5 | 19.7 | 14.0 | 7,000 |
| Potassium | 2.50 | 3.92 | 20.8 | 8.3 | 10.5 | 40 |
|  | 2.20 | 3.45 | 19.9 | 9.05 | 10.5 | 7 |
|  | 2.10 | 3.29 | 26.3 | 12.5 | 11.5 | 1,050 |

Ratio is a major parameter that determines the type of silicate species in solution. Silicate speciation refers to the size and shape of silicate molecules found in solution. The building block for these silicate species is the $SiO_4$ monomer. FIG. 1 shows a small sample of the various silicate species that can be found in a silicate solution (e.g., monomer, dimers, trimers, oligomers, chains, rings of silicate anions, etc.).

FIG. 2 shows the trend towards high molecular weight, more complex polysilicate anions with increasing ratio of $SiO_2:Me_2O$.

Because of differences in the size, shape and distribution of silicate species, there will be different rates of chemical reactions and varying degrees of interactions in the drilling fluids. It has been discovered the larger, more complex polysilicate anions found in aqueous high ratio silicate can be particularly beneficial for drilling conventional and unconventional hydrocarbons. A drilling fluid can be formulated with these larger more complex polysilicate anions by increasing the ratio of $SiO_2:Me_2O$ beyond the standard, commercially available aqueous alkali silicates.

The ratio of SiO2:Me2O is not increased to the point where the alkali silicate could be considered a silica sol also often referred to as colloidal silica. Sols are stable dispersions of discrete amorphous silica particles in a liquid, usually water. Commercial products contain silica particles having a diameter of about 3-100 nm, specific surface areas of 50-270 $m^2/g$ and silica contents of 15-50 wt %. According to Kirk-Othmer Encyclopedia of Chemical Technology, Fourth Edition, Volume 21, ISBN 0-471-52690-8, Copyright 1997 by John Wiley & Sons, such silica sols contain small (<1 wt %) amounts of stabilizers, most commonly sodium ions. A silica gel is a three dimensional network of silica particles.

Alkali silicate-based drilling fluids stabilize shales by the chemical reaction of the silicates on the shale surface and in the shale pores. Upon entering the shale pore network the silicate anions react with multivalent cations (e.g. $Ca^{+2}$, $Mg^{+2}$, $Al^{+3}$, $Fe^{+3}$, etc) present in the pore fluid and form an insoluble silicate metal precipitate. A second reaction is the pH of the pore fluid is neutral which causes the silicate anions to self-polymerize into a silica gel. These reactions are discussed in E. van Oort, Shell Research Rijswijk; D. Ripley, I. Ward, J. W. Chapman, BW Mud Aberdeen, R. Williamson Mobil, M. Aston, BP Exploration: Silicate-Based Drilling Fluids: Competent, Cost-effective and Benign Solutions to Wellbore Stability Problems", SPE paper 35059 presented at SPE/IADC Drilling Conference, New Orleans, La., March 1996. It is also noted in the same paper that shales containing small fractures are destabilized by drilling fluids that invade the cracks and elevate the fluid pressure in them. Soluble silicates have the ability to fill and pressure seal microfractures. The mechanism is again based on the gelling and precipitation of the silicate anions.

The polysilicate anions present in aqueous high ratio alkali silicates have a lower buffering capacity than conventional ratio silicates and therefore can more easily undergo the polymerization reaction. The polysilicate anions also require a lower concentration of available multivalent metals to form an insoluble metal silicate. High ratio silicate are therefore ideally suited for drilling that requires traditional prevention of shale hydration as well as stabilization by sealing microfractures and the prevention of shale delamination. These drilling challenges are commonly seen in the drilling of shale gas. High ratio aqueous alkali silicates are also suitable for stabilizing and mitigating drilling fluid loss in highly permeable and/or depleted zones.

Tar sands represent another type of unconventional hydrocarbons that can be drilled using an aqueous high ratio, aqueous alkali silicates as a drilling fluid additive. A commonly used method for producing tar sands is SAGD (steam assisted gravity drainage). The SAGD process involves drilling two parallel wells. The wells are drilled vertically through shale and an angle is then built as the well approaches the bitumen section. The bitumen section is drilled horizontal. The top shale sections often require inhibition. Upon drilling the bitumen, a key performance criteria requirement of a SAGD drilling fluid is the prevention of accretion. That is, bitumen sticking to metal surfaces such as the drill pipe. The drilling fluid should also provide a wellbore surface that is receptive to cement. A competent cement bond in the top and build section is required to isolate injected steam and prevent the leakage of gas. The aqueous high ratio alkali silicates were shown to prevent accretion as well as provide a suitable wellbore surface for a superior cement bond.

The higher level of alkalinity inherent in standard ratio aqueous sodium silicate and potassium silicate products can have drawbacks. This is particularly true when looking at the health, safety and environmental characteristics of silicate-based drilling fluids. Silicate-based drilling fluids are considered moderately alkaline and this alkalinity may cause minor skin and eye irritation. Factors affecting irritation include silicate concentration, exposure time and the ratio of the aqueous alkali silicate. Higher ratio aqueous sodium and potassium silicate allow for reduced alkalinity versus standard ratio aqueous silicates at similar concentrations. It also allows for the formulation of drilling fluids with higher concentrations of aqueous silicate with reduced risks associated with alkalinity.

Alkalinity also impacts the disposal of silicate-based drilling waste. At well completion there is a large volume of spent drilling fluid and fluid covered drill cuttings that need to be properly disposed. The toxicity and environmental performance of the drilling fluid and local government regulations dictate the disposal method for the drilling waste. In the case of drilling waste being disposed on soil surfaces, regulators usually have restrictions on drilling waste salinity. Salinity is typically measured by using the criteria of;
electrical conductivity (EC)
sodium adsorption ratio (SAR):

$$SAR = \frac{[Na+]}{\sqrt{\frac{1}{2}([Ca+2]+[Mg+2])}}$$

sodium content

Higher ratio silicates also show a reduction in some or all of these salinity values.

Prior art aqueous alkali silicate drilling fluids have been made with commercially available material. U.S. Pat. No. 2,133,759 to Vail et al. describes a silicate drilling fluid. Vail et al. notes that the composition of solid silicate gives desirable results over a wide range. The patent describes a silicate of soda having a ratio of $SiO_2$ to $Na_2O$ ranging from about 1.5:1 to 4:1.

U.S. Pat. No. 2,146,693 to Vietti et al. proposes to use "commercially available" solutions of sodium silicate. Vietti et al. describes sodium silicate with a molecular ratio of silica to sodium oxide greater than 1 and preferably in the range of 1.1:1 to 3.9:1. A ratio higher than 4.0 would not be commercially available.

U.S. Pat. No. 4,988,450 to Wingrave relates to an environmentally safe shale stabilization additive in an aqueous drilling fluid. Wingrave notes that potassium silicates can be obtained commercially in a variety of $SiO_2$ to $K_2O$ ratios. Those silicates having a $SiO_2/K_2O$ ratio in the range of about 0.5 to 2.5 are suitable for use in the present invention, however, the range of about 1.5 and 2.2 is preferred More recently, U.S. Pat. Nos. 7,137,459 and 7,441,609 to Dearing address some of the issues that sodium and potassium silicate can have on drilling fluid. These include lack of compatibility with commonly used lubricants for the reduction of the Coefficient of Friction in the drilling fluid as well as reacting with accumulated solids in the drilling fluid to create control problems for certain drilling fluid properties.

Dearing '459 uses a novel method for formulating a silicate-based drilling fluid. Potassium or sodium silicate as a solid glass is continuously added into the flow line as the drilling fluid is pumped downhole. The rate of addition of silicate ideally matches the rate of depletion on the wellbore. The patent claims adding a solid alkali metal silicate glass to the well flow line at a soluble silica concentration from 0.1 to 0.25% by weight. Tables A and B in Dearing '459 set forth the range of $SiO_2$:$Me_2O$ ratio silicates glasses available commercially. Dearing '429 does extend beyond the standard ratios to include a suitable weight ratio range weight range of $SiO_2$:$K_2O$ from 0.5:1 to about 3:1 For sodium silicate a weight range of $SiO_2$:$Na_2O$ from 1:1 to about. 4:1. The alkali silicate glass is added at a sufficient rate to dissolve and react with the drilled cuttings and freshly exposed surface of the borehole while leaving very little excess soluble silicate in solution.

Dearing '609 expands on the use of finely ground, very sparingly soluble, anhydrous alkali metal silicate glass material to decrease the swelling and water sorption of shale. The patent states that although sodium and potassium silicates have been used for decades to combat shale problems they have had limited success due to free soluble silicate in the drilling fluid. The main technical benefit of finely ground sparing soluble alkali metal silicate glass instead of aqueous liquid silicates is the slower rate of dissolution will reduce undesirable reactions of the silicate. The patent claims potassium silicate and the potassium silicate has a weight ratio of $SiO_2:K_2O$ from 2:1 to about 3.5:1. The patent claim a concentration of 0.1% to about 1% by weight soluble silica in the aqueous phase of the drilling fluid. As noted in Dearing '609 the use of a solid contrasts with liquid alkali silicates.

Silica and silicate chemistry dictates that these material go into solution as a monomeric silicic acid $(Si(OH)_4)$ or the silicate ion $(HSiO_3^-)$ depending on the pH. Once in solution, silicate speciation is strongly affected by other factors including concentration of silicate in solution, source of silica, temperature and time. On a molecular level, sparing soluble potassium silicate would be going into solution as the monosilicate anion. Once in solution it would quickly react with drill cuttings and exposed surfaces of the borehole. This contrasts with this inventions, where the silicate exists as large, complex polysilicate anions.

The sparingly soluble glass with the resulting low concentration of soluble silicate and the lower molecular weight silica species is useful but has limits for wellbore stabilization.

More recently, nanotechnology has been proposed as a method of shale stabilization. In United States Published Patent Application No. 2009/0314549 A1, Chenevert proposes various nanoparticles including silica nanoparticles to reduce shale permeability by using the nanoparticles to mechanically plug shale pore throats. The polysilicate anions in high ratio aqueous alkali silicates are single-phase soluble chemistries, not solid separate phases of silica dispersed in water. Similar to standard ratio alkali silicates, the high ratio aqueous alkali silicates achieves shale stabilization by chemically reacting with the shale. Beyond preventing shale hydration, high ratio aqueous alkali silicates provide other forms of wellbore stabilization such as sealing microfractures and preventing shale delamination.

As seen in the prior art, soluble silicates can be added to a drilling over a very wide range of concentration to achieve the desired level of wellbore stability. High ratio aqueous alkali silicates can likewise be formulated over a wide range of concentrations to match the inhibition requirements of the shale being drilled.

SUMMARY OF THE INVENTION

The present invention provides a method for wellbore stabilizatiton in the drilling of wells for conventional and unconventional energy sources, these include but are not limited to conventional oil and gas wells, shale gas and "tar sands". The method provides for a drilling fluid that can among other things; reacts with shale to prevent hydration and dispersion, seal microfractures, prevent shale delamination, prevent bitumen accretion, allow the drilling of depleted zones.

This invention uses larger, more complex polysilicate anions found in aqueous, high ratio alkali silicates. These high ratio aqueous silicates are beyond the ratio of traditional, commercially available silicates. These polysilicate anions facilitates quicker precipitation and polymerization reactions compared to standard ratio aqueous silicates. The higher ratio results in a silicate with lower salinity making for a more environmentally friendly drilling fluid. High ratio, aqueous alkali silicate can be added to the drilling fluid at a wide range of concentrations to achieve the necessary wellbore stabilization. Soluble silica level in the drilling fluid can range from 0.25% to about 6% by weight of the drilling fluid. The pH of the drilling fluid is preferably maintained above pH 10.

DETAILED DESCRIPTION OF THE PREFERRED EMBODIMENTS

Figure 1:
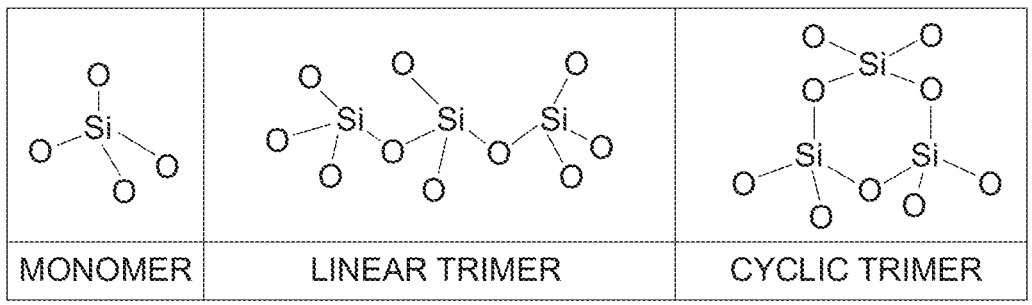
FIG. 1 is a schematic representation of various silicate species that can be found in a silicate solution.
Figure 2:
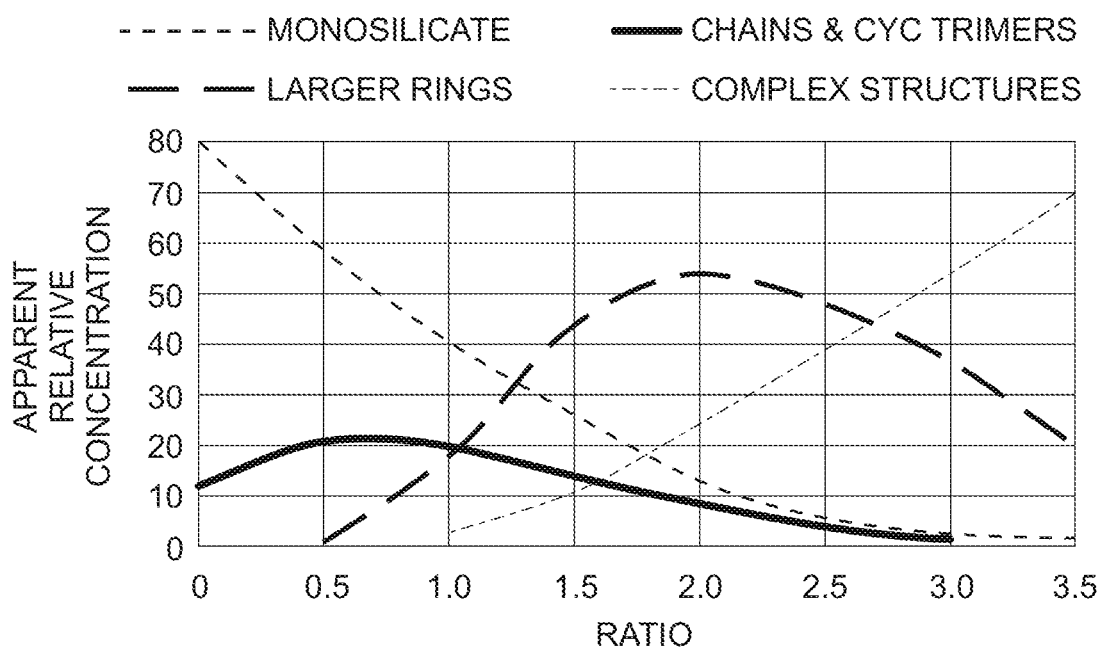
FIG. 2 is a graph showing the trend towards high molecular weight, more complex polysilicate anions with increasing ratio of $SiO_2:Me_2O$.

It has been discovered that high ratio sodium and potassium silicate offer improved health, safety and environmental characteristics vs. traditional ratio products. Further, these high ratio products can offer improved shale stabilization characteristics. Unlike the prior art described above, the present invention is based on the use of aqueous sodium and potassium silicate. As an aqueous product, the product is completely soluble and available in the drilling fluid. The silicate species in solution are larger, more complex than found in standard ratio silicate or sparing soluble glass. Further, a drilling fluid can be formulated to a much higher concentration of soluble $SiO_2$ than achievable in the prior art. For high ratio aqueous alkali silicates, the molar ratio of $SiO_2:Me_2O$ can range from just over 4.0 to about 12.0. Most preferably, the molar ratio of $SiO_2:Me_2O$ ranges from just over 4.0 to about 7.0.

Two commercial processes exist for the production of sodium and potassium silicate. The more common of these two methods is the fusing of high purity sand with either soda ash or potassium carbonate in a furnace. The ratio of $SiO_2$ to $Na_2O$ (or $K_2O$) is dependent on the quantity of raw material. This process can be represented by the following equation:

$$Na_2O+SiO_2 \longrightarrow (SiO_2)_x.(Na_2O)+CO_2 \text{ x=1.8 to 3.22 (sodium silicate)}$$

The second commercial method of production is made without a furnace and involves the direct attack of silica with caustic. This method only allows for the production of lower ratio silicates. This method is represented by the following equation:

$$NaOH+SiO_2 \longrightarrow (SiO_2)_x.(Na_2O)+CO_2 \text{ x=1.8 to 2.5 (sodium silicate)}$$

The physical properties of alkali metal silicates such as viscosity, concentration and pH are controlled by the ratio of $SiO_2$ to $Na_2O$ (and $K_2O$).

Various techniques for the manufacture of high ratio alkali silicates are known. Typically, these high ratio silicates were developed for use in coatings and/or binder applications. U.S. Pat. No. 3,492,137 to Iler describes a stable, aqueous sodium polysilicate containing 10% to 30% by weight solids with a weight ratio of $SiO_2$ to $Na_2O$ from 4.2:1 to 6:1 The sodium polysilicate is prepared by mixing amorphous silica with a sodium silicate solution and heating the mixture between 40° C. and 100° C.

U.S. Pat. No. 3,625,722 to Von Freyhold describes a process for preparing stable, alkali metal silicate solutions with a silica content from 10 to 35% and molar ratio ranging between 4:1 and 12:1. Soluble sources of silica are added to the silicate under heat. Stability is obtained by incorporating sufficient amounts of certain quaternary ammonium compounds.

U.S. Pat. No. 5,624,651 to Bass describes a method of increasing the ratio of $SiO_2:Me_2O$ and $SiO_2:Me_2O$ high ratio alkali silicates using a cation exchange resin to remove smaller size anions from solution and leaving the larger more siliceous anions in the external solution. This method discloses $SiO_2:Me_2O$ molar ratios from about 3.5 to about 6.0.

High ratio, aqueous sodium and potassium silicates can be prepared using methods described in the above patents. Using methods similar to those described in Iler, high ratio aqueous potassium silicates and aqueous sodium silicate were prepared with properties indicated in Table IIa. High ratio aqueous silicates were compared against colloidal silica (7 nm), 3.0 weight ratio ground potassium silicate glass (less than 180 mesh on Tyler screen). PQ grade N® sodium silicate has a weight ratio of 3.2 and represents the highest ratio for standard sodium silicate. PQ Kasil® 1 potassium silicate has a weight ratio 2.5 and represents the highest ratio for standard potassium silicate. Controls are indicated in Table IIb.

TABLE IIa

High Ratio Aqueous Silicates

| | $K_2O$ | $Na_2O$ | $SiO_2$ | Weight Ratio | Molar ratio | Solids |
|---|---|---|---|---|---|---|
| 4.5 ratio aqueous sodium silicate | — | 4.3 | 19.2 | 4.5 | 4.65 | 23.5 |
| 3.0 ratio aqueous potassium silicate | 5.9 | — | 17.9 | 3.0 | 4.71 | 23.8 |
| 4.0 ratio potassium silicate | 4.5 | — | 17.8 | 4.0 | 6.28 | 22.3 |

TABLE IIb

Silica and Silicate Controls

| | $K_2O$ | $Na_2O$ | $SiO_2$ | Weight Ratio | Molar ratio | Solids |
|---|---|---|---|---|---|---|
| 3.22 ratio aqueous sodium silicate | — | 8.9 | 28.7 | 3.2 | 3.33 | 37.6 |
| Colloidal silica | — | — | 40 | >50 | >50 | 40 |
| 2.5 ratio aqueous potassium silicate | 8.3 | — | 20.8 | 2.5 | 3.92 | 29.1 |
| 3.0 ratio ground potassium silicate glass | 25 | — | 75 | 3.0 | 4.71 | 100 |

A base drilling fluid was formulated according to Table III using commercially available material. Unless otherwise indicated, laboratory testing was conducted in accordance with standard American Petroleum Institute Procedures using standard equipment.

TABLE III

Base Drilling Fluid Formulation

| Water | 1000 ml |
|---|---|
| Viscosifier - Xanthan gum | 2 g |
| Fluid loss additive - Polyanionic cellulose | 2 g |
| Fluid loss additive - starch | 2 g |
| Simulated drill solids - rev dust | 20 g |

EXAMPLE 1

Example 1 demonstrates the effectiveness of high ratio sodium silicate at sealing microfractures and the prevention of shale delamination. Core samples of Shaftsbury shale were selected of similar size, shape, fracture level and lamination. Drilling fluids were formulated to an equivalent $SiO_2$ level of 2.5% by weight using the drilling fluid in Table 3. The selected shale was placed in 350 grams of the indicated drilling fluid and hot rolled for 16 hours at 120° F. Visible observations on shale delamination are noted in Table IV.

TABLE IV

Fractured, laminated shale after hot rolling

| | Control No $SiO_2$ | 2.5 Aqueous K Silicate | 3.0 Aqueous K Silicate | 4.0 Aqueous K Silicate | 3.0 ground K Silicate silicate | Colloidal silica |
|---|---|---|---|---|---|---|
| Base fluid | 350 g | 307.9 g | 301.1 g | 300.8 g | 338.3 g | 328.1 g |
| Shale inhibitor | — | 42.1 g | 48.9 g | 49.2 g | 11.6 g | 21.9 g |
| Weight before hot rolling | 30.59 g | 40.94 g | 38.09 g | 41.33 g | 33.74 g | 41.67 g |
| After hot rolling | Multiple delamination | Single delam. | Intact | Intact | Multiple delam. | Multiple delam. |

EXAMPLE 2

Example 2 compares the shale dispersion of simulated Arne cuttings (mesh size 5-8 inch) by hot rolling 20 gram cuttings for ~16 hours at 150° F. in a high ratio potassium silicate. Drilling fluids were formulated to have 2% $SiO_2$ by weight in the drilling fluid. After hot rolling the cuttings were screened on 20 mesh screen and rinsed with deionized water and dried. Table V indicates the weight of recovered shale.

TABLE V

Arne shale cuttings recovered after hot rolling

|  | Control No $SiO_2$ | 2.5 Aqueous K Silicate | 3.0 Aqueous K Silicate | 4.0 Aqueous K Silicate | Colloidal silica |
|---|---|---|---|---|---|
| Base fluid | 350 g | 316.3 g | 310.9 g | 310.7 g | 332.5 g |
| inhibitor | — | 33.7 g | 39.1 g | 39.3 g | 17.5 g |
| Weight of shale | 20 g | 20 g | 20 g | 20 g | 20 g |
| After hot rolling | 9.7 g | 19.5 g | 17.9 g | 17.8 g | 1.4 g |
| % Shale Recovery | 48.5% | 97.5% | 89.5% | 89% | 7% |

EXAMPLE 3

Example 3 compares the shale dispersion of simulated Joli Fou shale cuttings at different concentrations of high ratio aqueous sodium silicate. Shale recovery is also compared against standard ratio sodium silicate and colloidal silica at 2% $SiO_2$ by weight in the drilling fluid. Cuttings were subject to the same testing procedure described in Example 2. Table VI presents the results of this experiment.

TABLE VI

Shale recovery vs. concentration of high ratio aqueous sodium silicate

|  | Control No $SiO_2$ | 0.5% $SiO_2$ 4.5 ratio Na Silicate | 1% $SiO_2$ 4.5 ratio Na Silicate | 2% $SiO_2$ 4.5 ratio Na Silicate | 2% $SiO_2$ 3.2 ratio Na Silicate | 2% Colloidal Silica |
|---|---|---|---|---|---|---|
| Base fluid | 350 g | 340.9 g | 331.8 g | 313.5 g | 325.6 g | 332.5 g |
| inhibitor | — | 9.1 g | 18.2 g | 36.5 g | 24.4 g | 17.5 g |
| Weight of shale | 20 g | 20 g | 20 g | 20 g | 20 g | 20 g |
| After hot rolling | 8.0 g | 11.6 g | 13.4 g | 17.0 g | 16.4 g | 9.1 g |
| % Shale Recovery | 40% | 58% | 67% | 85% | 82% | 45.5% |

EXAMPLE 4

Electrical conductivity is a key component used to measure the salinity of a drilling fluid. Example 4 compares the electrical conductivity of high ratio aqueous sodium and potassium silicate drilling fluids against standard, high ratio alkali silicates. The electrical conductivity was measured on drilling fluids from Example 2 and 3 after hot rolling. The results are presented in Table VII below.

TABLE VII

Electrical Conductivity of Drilling Fluid Filtrate (mS/cm)

|  | 2.0% $SiO_2$ |
|---|---|
| 3.2 ratio aqueous sodium silicate | 11.2 |
| 4.5 ratio aqueous sodium silicate | 7.8 |
| 2.5 ratio aqueous potassium silicate | 11.2 |
| 4.0 ratio aqueous potassium silicate | 7.1 |

EXAMPLE 5

For drilling tar sands, a key drilling fluid requirement is the prevention of accretion. A drilling fluid was prepared according to Table IIa. Different concentrations of high ratio aqueous potassium silicate were prepared with the properties given in Table VIII. Ground potassium silicate glass and colloidal silica were used as controls. Testing involved placing a metal rod inside an aging cell adding 50 grams bitumen and rolling for 60 minutes at 40° C. Table VIII indicates the weight of bitumen adhering to the metal bar.

TABLE VIII

Weight (grams) of bitumen adhering to the metal roller

|  | 0% $SiO_2$ | 0.25% $SiO_2$ | 0.5% $SiO_2$ | 1% $SiO_2$ | 2.0% $SiO_2$ |
|---|---|---|---|---|---|
| control | 4.74 g |  |  |  |  |
| 2.5 aqueous potassium silicate |  | 0.24 g | 0.43 g | 0.25 g | 0.08 g |
| 3.0 aqueous potassium silicate |  | 0.31 g | 0.61 g | 0.15 g | 0.02 g |
| 4.0 aqueous potassium silicate |  | 0.57 g | 0.56 g | 0.28 g | 0.22 g |
| Colloidal silica |  | 2.45 g | 4.42 g | 2.21 g | 3.15 g |
| 3.0 ground potassium glass |  | 3.92 g | 4.94 g | 4.11 g | 3.21 g |

The above examples demonstrate that drilling fluids containing aqueous high ratio alkali silicates provide the unexpected result of obtaining the same or higher level of shale stabilization as standard ratio silicate but with significantly less salinity. High ratio aqueous alkali silicates achieve shale stabilization by chemically reacting with the shale. Compared to colloidal silica, high ratio aqueous alkali silicate provide significantly higher level of shale stabilization across a broader range of wellbore conditions.

Although the invention is illustrated and described herein with reference to specific embodiments, the invention is not intended to be limited to the details shown. Rather, various modifications may be made in the details within the scope and range of equivalents of the claims and without departing from the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Use of the term "about" should be construed as providing support for embodiments directed to the exact listed amount. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The is claimed is:

1. An aqueous phase drilling fluid for improving wellbore stabilization comprising an aqueous drilling fluid; and a high ratio, wholly solubilized, aqueous alkali silicate in the form of polysilicate anions wherein the molar ratio of silica oxide to alkali oxide is greater than 4.0 and less than 12.0, wherein said silicate is present in solution as free polysilicate species and said high ratio aqueous alkali silicate chemically reacts with shale in the subterranean formation adjacent to the wellbore.

2. The drilling fluid of claim 1 wherein the concentration of said silica oxide in the drilling fluid is in the range of 0.25 weight % to 6.0 weight %.

3. The drilling fluid of claim 2 wherein the molar ratio of silica oxide to alkali oxide is greater than 4.5.

4. The drilling fluid of claim 3 wherein the molar ratio of silica oxide to alkali oxide is less than 7.0.

5. The drilling fluid of claim 2 wherein the alkali oxide is sodium oxide.

6. The drilling fluid of claim 2 wherein the alkali oxide is potassium oxide.

7. The drilling fluid of claim 1 wherein the molar ratio of silica oxide to alkali oxide is greater than 4.5.

8. The drilling fluid of claim 7 wherein the molar ratio of silica oxide to alkali oxide is less than 7.0.

9. The drilling fluid of claim 1 wherein the alkali oxide is sodium oxide.

10. The drilling fluid of claim 1 wherein the alkali oxide is potassium oxide.

11. The drilling fluid of claim 1 wherein said drilling fluid comprising a high ratio aqueous alkali silicate has a reduced salinity relative to a drilling fluid comprising a conventional ratio aqueous alkali silicate.

12. The drilling fluid of claim 1 wherein said chemical reaction of said high ratio aqueous silica oxide and said shale stabilizes said shale.

13. The drilling fluid of claim 1 wherein said chemical reaction of said high ratio aqueous silica oxide and said shale prevents shale delamination.

14. The drilling fluid of claim 1 wherein said chemical reaction of said high ratio aqueous silica oxide and said shale seals microfractures and porous zones.

15. The drilling fluid of claim 1 wherein said chemical reaction of said high ratio aqueous silica oxide and said shale prevents bitumen accretion.

16. The drilling fluid of claim 1 wherein the pH of said drilling fluid is maintained above 10.

17. A continuous aqueous phase drilling fluid for improving wellbore stabilization in oil sands comprising an aqueous drilling fluid; and a high ratio, wholly solubilized, hydrous alkali silicate in the form of polysilicate ions wherein the molar ratio of silica oxide to alkali oxide is greater than 4.0 and less than 12.0, wherein said silicate is present in solution as free polysilicate species.

* * * * *